(12) United States Patent
Zhang

(10) Patent No.: US 10,273,160 B2
(45) Date of Patent: Apr. 30, 2019

(54) GRAPHENE OXIDE PURIFICATION METHOD AND GRAPHENE OXIDE

(71) Applicant: Linde Zhang, Shenzhen (CN)

(72) Inventor: Linde Zhang, Shenzhen (CN)

( * ) Notice: Subject to any disclaimer, the term of this patent is extended or adjusted under 35 U.S.C. 154(b) by 0 days.

(21) Appl. No.: 16/086,012

(22) PCT Filed: Jun. 6, 2017

(86) PCT No.: PCT/CN2017/087295
§ 371 (c)(1),
(2) Date: Sep. 18, 2018

(87) PCT Pub. No.: WO2017/174042
PCT Pub. Date: Oct. 12, 2017

(65) Prior Publication Data
US 2019/0100437 A1    Apr. 4, 2019

(30) Foreign Application Priority Data

Apr. 7, 2016 (CN) .......................... 2016 1 0213661

(51) Int. Cl.
*C01B 32/198* (2017.01)
*B01J 41/07* (2017.01)
*B01J 39/07* (2017.01)

(52) U.S. Cl.
CPC .............. *C01B 32/198* (2017.08); *B01J 39/07* (2017.01); *B01J 41/07* (2017.01)

(58) Field of Classification Search
CPC .......... C01B 32/198; B01J 41/07; B01J 39/07
See application file for complete search history.

(56) References Cited

U.S. PATENT DOCUMENTS

2014/0147368 A1* 5/2014 Ting ........................ C01B 32/23
423/415.1

FOREIGN PATENT DOCUMENTS

| CN | 103570009 A | 2/2014 |
| CN | 104787759 A | 7/2015 |
| CN | 105752974 A | 7/2016 |

OTHER PUBLICATIONS

Guojian Wang, "3.4Function and application of ion exchange resin and adsorption resins", Functional polymer material Second Edition, Tongji University Press, Jun. 30, 2014, pp. 79-82.

* cited by examiner

*Primary Examiner* — Richard M Rump
(74) *Attorney, Agent, or Firm* — Gokalp Bayramoglu

(57) ABSTRACT

The present invention discloses a graphene oxide purification method and a graphene oxide. The purification method of graphene oxide includes the following steps: ion exchange purification: sequentially passing a graphene oxide solution through a cation exchange resin and an anion exchange resin. The cation exchange resin is a hydrogen cation exchange resin, and the anion exchange resin is a hydroxide anion exchange resin. The purification method provided by the present invention has the advantages of simple operation and high purification efficiency, and the content of each metal impurity after purification is less than 10 ppm. In addition, the used ion exchange resin can also be reused through regeneration, which is energy-saving and environment-friendly.

16 Claims, No Drawings

GRAPHENE OXIDE PURIFICATION METHOD AND GRAPHENE OXIDE

CROSS REFERENCE TO RELATED APPLICATIONS

This application is the national phase entry of International Application PCT/CN2017/087295, filed on Jun. 6, 2017, which is based upon and claims priority to Chinese Patent Application No. 201610213661.1, filed on Apr. 7, 2016, the name of the Chinese Patent Application is Non-oxidized Graphene Purification Method and Graphene Oxide. The entire content of this application is incorporated herein by reference.

TECHNICAL FIELD

The present invention relates to the field of graphene materials, in particular to a graphene oxide purification method and a graphene oxide.

BACKGROUND

Graphene oxide is a product of graphite powder after chemical oxidation and is a new carbon material with excellent performance. Graphene oxide is an important intermediate for chemical preparation of graphene. Additionally, graphene oxide has relatively high specific surface area and also has rich functional groups on its surface. The graphene oxide can be used to prepare composite materials with other materials.

In the preparation process of graphene oxide, a large amount of impurity ions will be inevitably introduced, such as heavy metal ions like manganese ions, iron ions, and nickel ions, etc., as well as sodium ions and potassium ions and so on. The content of impurities in graphene oxide has an important effect on its own performance and its subsequent products (such as graphene, graphene oxide-based composite materials, etc.), making it difficult to apply in fields requiring high purity graphene oxide such as the biological field, the medical field, etc.

Currently, a main purification method of graphene oxide is washing purification. However, the purification effect is not good and the impurity ion content is still high.

SUMMARY

In order to solve the above-mentioned technical problems, the present invention provides a graphene oxide purification method and a graphene oxide. Specifically, in one aspect, the present invention provides a purification method of graphene oxide, which includes the following steps. Ion exchange purification: sequentially passing a graphene oxide solution through a cation exchange resin and an anion exchange resin, wherein the cation exchange resin is a hydrogen cation exchange resin, and the anion exchange resin is a hydroxide anion exchange resin.

Further, a solid content of the graphene oxide solution is 0.2-0.5 wt %.

Further, before ion exchange purification, the following steps are included: salting-out washing purification: A1, mixing graphene oxide solution with a complexing agent solution and filtering to obtain a filter cake containing graphene; A2, continuously washing the filter cake with a complexing agent solution; A3, performing acid pickling and water washing on the filter cake washed by the complexing agent solution sequentially.

Further, the complexing agent in step A1 is one or more of disodium ethylenediamine tetraacetate, trisodium aminotriacetate, disodium aminotriacetate, cyclohexanediamine tetraacetic acid, disodium cyclic ethylenediamine tetraacetate, citrate, acetate, lactate, aminocarboxylate, mercaptoalkane sulfonate, pyrophosphate, and halogen anion salt. The complexing agent in step A2 is one or more of disodium ethylenediaminetetraacetate, disodium ethylenediaminetetraacetate, trisodium aminotriacetate, disodium aminotriacetate, cyclohexanediamine tetraacetic acid, disodium cyclic ethylenediaminetetraacetate, citrate, acetate, lactate, aminocarboxylate, mercaptoalkane sulfonate, pyrophosphate, and halogen anion.

Further, the solid content of graphene oxide in the step A1 is 0.05%-5%, the concentration of the complexing agent solution is 0.15 wt %-5.3 wt %; the concentration of the complexing agent solution in the step A2 is 0.15 wt %-5.3 wt %.

Further, after the ion exchange purification, the following steps are included: deep purification: purifying a graphene oxide solution obtained after the ion exchange purification by using electrodeionization.

Further, the deep purification is specifically as follows: adding the graphene oxide solution obtained after the ion exchange purification to an electrodeionization system, collecting a solution in a fresh water chamber, wherein in the electrodeionization system, a resistivity of concentrated water is 500-1000 us/cm, a resistance of product water is 0.1-0.5 MΩ/cm, and a current of the system is 5-6 A.

Further, a solid content of the graphene oxide solution is 0.01-10%.

Further, the method further includes the step of drying the graphene oxide solution after the ion purification, the graphene oxide solution after the salting-out washing purification, or the graphene oxide solution after the deep purification to obtain a graphene oxide solid.

The present invention also provides a graphene oxide with a content of each metal impurity less than 10 ppm.

The present invention provides a purification method of graphene oxide, which includes the following steps: sequentially passing a graphene oxide solution through a hydrogen cation exchange resin and a hydroxide anion exchange resin, and performing a purification by ion exchange. On the one hand, the ion exchange resin has the characteristics of high charge concentration on the surface and stronger ion adsorption capacity than graphene oxide, which can realize the adsorption and removal of impurity ions with high removal amount. On the other hand, using hydrogen cation exchange resin and hydroxide anion exchange resin can not only absorb impurity ions, but also avoid introducing other impurities that are not easy to remove, avoiding additional complicated impurity removal procedures. Finally, the graphene oxide solution is set to pass through cation exchange resin firstly and then through anion exchange resin to avoid a deactivation of exchange resin caused by deposition of heavy metals, thereby ensuring the adsorption rate of impurity ions and prolonging the service life of ion exchange resin. To sum up, the purification method provided by the present invention has the advantages of simple operation and high purification efficiency, and the content of each metal impurity after purification is less than 10 ppm. In addition, the used ion exchange resin can also be reused through regeneration, which is energy-saving and environmentally-friendly. Further, after deep purification, the content of each metal impurity can be less than 0.01 ppm; In addition, impurity salt can be discharged in the form of concentrated water by the deep purification system after removing impurities, and can be collected and recycled as by-products.

DETAILED DESCRIPTION

The present invention discloses a graphene oxide purification method and a graphene oxide. Those skilled in the art can improve process parameters by referring to the content of the present invention to realize the method. In particular, it should be noted that all similar substitutions and modifications will be obvious to those skilled in the art and are considered to be included in the present invention. The method and application of the present invention have been described with reference to the preferred embodiments, and it will be apparent to those skilled in the art that the method and application described herein can be modified or appropriately altered and combined without departing from the content, spirit and scope of the present invention to realize and apply the technique of the present invention.

The embodiments of the present invention provide a purification method of graphene oxide. The method includes the following steps.

Ion exchange purification is specifically as follows: a graphene oxide solution sequentially passes through a cation exchange resin and an anion exchange resin, the cation exchange resin is a hydrogen cation exchange resin, and the anion exchange resin is a hydroxide anion exchange resin.

In the method of ion exchange purification provided by the present embodiment, the characteristic of competing adsorption between the graphene oxide and the ion exchange resin, namely, graphene oxide and ion exchange resin compete for the adsorption of ions. While the cation exchange resin and anion exchange resin have higher charge concentrations on their surfaces and stronger adsorption capacity than that of graphene oxide, thereby the adsorption and removal of impurities is realized.

In the embodiment of the invention, the cation exchange resin is a hydrogen cation exchange resin, and the anion exchange resin is a hydroxide anion exchange resin. Compared with other types of ion exchange resins, such as sodium or chlorine ion exchange resins, using hydrogen and hydroxide ion exchange resins can reduce the introduction of other impurity ions while adsorbing impurity ions in the original graphene oxide. Specifically, the main impurity ions in graphene oxide solution are ions such as $K^+$, $Mn^{2+}$, $SO_4^{2-}$, etc. Such ions may reach 10000 ppm or higher concentrations before purification. If the commonly used sodium or chlorine ion exchange resin is used, the ions in the system will be directly converted into $Na^+$ and $Cl^-$, which is equivalent to introducing new impurities that is not easy to remove. The reaction formula is as follows:

Sodium Ion Exchange Resin:

$$Mn^{2+}+2R-Na \rightarrow R_2-Mn+2Na^+ \text{ (impurity ion)}$$

$$K^++R-Na \rightarrow R-K+Na^+ \text{ (impurity ion)}$$

or Chlorine Ion Exchange Resin:

$$SO_4^{2-}+2R-Cl \rightarrow R_2-SO_4^{2-}+Cl^- \text{ (impurity ion)}$$

If using hydrogen or hydroxide ion exchange resin, the newly introduced $H^+$ and $—OH^-$ can be combined into water. The water can be easily removed in concentration or other treatment. The reaction formula is as follows:

Hydrogen Ion Exchange Resin $$Mn^{2+}+2R-H \rightarrow R_2-Mn+2H^+$$

$$K^++R-H \rightarrow R-K+H^+$$

Hydroxide Ion Exchange Resin $$SO_4^{2-}+2R-OH \rightarrow R_2-SO_4^{2-}+OH^-$$

Furthermore, the graphene oxide solution to be purified needs to flow through the cation exchange resin first to convert cations such as $Mn^{2+}$ and $K^+$ into $OH^-$, and then flow through the anion exchange resin to convert anions such as $SO_4^{2-}$ into $H^+$. If the sequence of graphene oxide solution flowing through the two ion exchange resins is reversed, heavy metals such as manganese will be settled by alkali, thus rapidly deactivating the ion exchange resins, and reducing the ion adsorption effect as well as the service life of the ion exchange resins.

Therefore, the present invention uses the ion exchange method to purify graphene oxide. The graphene oxide solution sequentially passes through the hydrogen cation exchange resin and the hydroxide anion exchange resin. On the one hand, the ion exchange resin has the characteristics of high charge concentration on the surface and stronger ion adsorption capacity than that of graphene oxide, which can realize the adsorption and removal of impurity ions with high removal amount. On the other hand, using hydrogen cation exchange resin and hydroxide anion exchange resin can not only absorb impurity ions, but also avoid introducing other impurities that are not easy to remove, avoiding additional complicated impurity removal procedures. Finally, the graphene oxide solution is set to pass through cation exchange resin firstly and then through anion exchange resin to avoid a deactivation of exchange resin caused by deposition of heavy metals, thereby ensuring the adsorption rate of impurity ions and prolonging the service life of ion exchange resin. To sum up, the purification method provided by the present invention has the advantages of simple operation and high purification efficiency. In addition, the used ion exchange resin can also be reused through regeneration, which is energy-saving and environment-friendly.

The steps of the above-mentioned ion exchange purification may specifically include:

B1, preparing graphene oxide solution;

B2, loading the cation exchange resin and anion exchange resin into an ion exchange column, setting the cation exchange resin in an upper section and the anion exchange resin in a lower section;

B3, sending the graphene oxide solution to the ion exchange column.

The sequence of the above-mentioned steps B1 and B2 is not limited. A flow rate of the graphene oxide solution flowing through the cation exchange resin and the anion exchange resin is preferably 50-200 L/h.

The solid content of the graphene oxide solution used in the above method is preferably 0.2 wt %-0.5 wt %. The graphene oxide with too high concentration is unfavorable to ion exchange, has poor fluidity, and is easy to block the column. Moreover, energy consumption is required for increasing the concentration of the solution. However, if the concentration of the solution is too low, the subsequent concentration will be difficult and the cost will be high.

The above-mentioned cation exchange resin may be a strong acidic cation exchange resin, a weak acidic cation exchange resin, or a mixture of the two. The weak acidic cation exchange resin is preferably used. The above-mentioned anion exchange resin may be a strong alkaline anion exchange resin, a weak alkaline anion exchange resin, or a mixture of the two. The weak alkaline anion exchange resin is preferably used.

Considering that most of the common cation exchange resins at present are sodium type, and most of the anion exchange resins are chlorine type, the above-mentioned ion exchange resins need to be activated to obtain hydrogen cation exchange resins and hydroxide anion exchange resins when they are applied to the purification method provided by the embodiments of the present invention.

The hydrogen cation exchange resin can be prepared according to the following method:

D1, washing the sodium cation exchange resin with water, performing acid pickling, and then perform water washing to neutrality;

D2, performing alkaline washing on the ion exchange resin obtained in the step D1 and then washing with water to neutrality;

D3, performing acid pickling on the ion exchange resin obtained in the step D2 and then washing with water to neutrality to obtain hydrogen cation exchange resin.

The above-mentioned step D1 is used to remove possible metal impurities and prevent the metal impurities from subsequently entering the graphene oxide. The step of acid pickling can be performed by using 5-10 wt % dilute hydrochloric acid. Step D2 is used to neutralize the acid remaining in step D1 and remove ions dissolved out of metals in an acidic environment. In the alkaline washing step, 5-10 wt % sodium hydroxide solution may be used. Step D3 is used to convert the sodium resin into the hydrogen resin to obtain a pure hydrogen cation exchange resin.

The hydroxide anion exchange resin can be prepared according to the following method:

E1, washing the chlorine anion exchange resin with water, washing with sodium bicarbonate solution, and then washing to neutrality with water;

E2, washing the ion exchange resin obtained in step E1 with sodium hydroxide solution, and then washing to neutrality with water to obtain hydroxide anion exchange resin.

In this activation method, sodium bicarbonate-sodium hydroxide system is used for activation, which consumes less sodium hydroxide and costs compared to activation with sodium hydroxide solution alone, and the remaining small amount of bicarbonate will spontaneously decompose into carbon dioxide and water in an acidic environment without causing any effect.

After the graphene oxide solution is purified by the ion exchange method, the step of regenerating the used cation exchange resin and anion exchange resin may also be included to realize the recycling of the ion exchange resin. Specifically:

The regeneration process of the used cation exchange resin is as follows:

The cationic resin is washed with water, then acid pickling is performed with concentrated hydrochloric acid, and finally the cationic resin is washed to neutrality with water.

The regeneration process of the used anion exchange resin is as follows:

The anionic resin is washed with water, then washed with sodium bicarbonate solution, after that, the anionic resin is washed with water to neutrality; then the anionic resin is washed with sodium hydroxide solution, and finally washed to neutrality with water.

When purifying graphene oxide by using the above-mentioned ion exchange method, the concentration of each metal impurity ion in the graphene oxide to be purified is preferably not more than 200 ppm. If the concentration of impurity ions is too high, graphene oxide will flocculate due to the presence of heavy metals and cannot pass through the ion exchange column, thus blocking the ion exchange column and preventing purification. In addition, graphene oxide with impurity ions of too high concentration will also cause failure of the regeneration of the ion exchange resin due to poisoning caused by too many impurity metal ions adsorbed on the ion exchange column, thus completely losing efficiency.

For the case where the content of the impurity in the graphene oxide is too high, it is preferable to perform the pre-purification treatment according to the following manner before performing ion exchange purification:

salting-out washing purification: A1, mixing the graphene oxide solution with a complexing agent solution and filtering to obtain a filter cake containing graphene; A2, continuously washing the filter cake with a complexing agent solution; A3, performing acid pickling and water washing on the filter cake washed by the complexing agent solution sequentially.

The above-mentioned step A1 is a process of salting out the graphene oxide and removing heavy metal ions. Specifically, on the one hand, the complexing agent solution, as a high-concentration electrolyte solution, has high ionic strength and can compress the electric double layer of graphene oxide micelles, causing the zeta potential of graphene oxide micelles to drop, reducing a repulsive force between colloidal particles, and finally agglomerating and precipitating graphene oxide precipitates. This process is called salting out of the graphene oxide.

At the same time, there is a process of competitive adsorption between the graphene oxide and the complexing agent solution. By using the complexing agent solution with stronger coordination capacity and higher concentration, a part of heavy metal ions such as manganese, iron, copper, etc. which is originally adsorbed on the graphene oxide can be combined with the complexing agent to form more stable chemical species, thus being separated from the graphene oxide, and correspondingly, cations carried by the complexing agent are supplemented and enter the adsorption site of graphene oxide.

The reaction formula of the above-mentioned process is as follows:

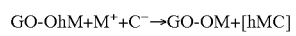

$$GO\text{-}OhM + M^+ + C^- \rightarrow GO\text{-}OM + [hMC]$$

GO-OhM: an oxygen-containing functional group O of GO adsorbs heavy metal hM ion;

$M^+$: cations carried by the complexing agent, such as Na+;

$C^-$: anions of the complexing agent, such as $EDTA^{2-}$;

GO-OM: an oxygen-containing functional group O of GO adsorbs the precipitate formed by M cation;

[hMC]: heavy metal ions form more stable complexes with the complexing agent.

Although a part of heavy metal ions has been removed from the filter cake obtained after the treatment according to step A1, most heavy metal ions cannot be removed in step A1. Step A2 is a step of further removing the remaining heavy metal ions. Specifically, this step is a continuous washing using the complexing agent solution. The principle is similar to that of a chromatographic column, wherein the graphene oxide is equivalent to a stationary phase and the complexing agent solution is equivalent to a mobile phase. The mobile phase (complexing agent solution) without heavy metal ions passes through the stationary phase of the graphene oxide, carrying the heavy metal ions backward and finally leaves the filter cake. This processing is continuously executed. Therefore, most of the heavy metal ions adsorbed on the graphene oxide can be finally removed from the graphene oxide.

According to the above-mentioned steps A1 and A2, most of the raw materials can be converted into a mixed system of GO-OH and GO-OM. Step A3 is a step of further processing GO-OM into purer GO-OH. The purification principle of this step is similar to that of step A2. The stationary phase is still a graphene oxide filter cake, but the mobile phase and M+ introduced by A2 migrate on GO and elute continuously, thus converting GO-OM into GO-OH. That is, GO-OM+$H^+$→GO-OH+$M^+$. After acid pickling, water washing is needed. During the water washing process, with the gradual decrease of the concentration of residual acid in the stage of acid pickling, the ionic strength in the system also decreases, making the electric double layer of the graphene oxide micelles gradually expand and improves a solvation degree of micelles, so that the filter cake of the graphene oxide stops salting out gradually and returns to the form of solution.

Specifically, when $M^+$ is no longer contained in an eluate of acid pickling, the acid pickling can be stopped and switched to water washing. In order to avoid the loss of products, it is preferable to monitor the pH of an eluate of water washing during the water washing step. When the pH exceeds 5 and the effluent begins to become turbid, the water washing stage can be stopped. The filter cake of GO-OH is diluted and reconstituted back into the solution for subsequent purification.

The complexing agent used in step A1 and step A2 may be the same or different, and the complexing agent only needs to satisfy the requirement that the adsorption capacity to heavy metal ions is higher than that of the graphene oxide. The complexing agent may be an organometallic complex such as disodium ethylenediamine tetraacetate (EDTA-2Na), trisodium aminotriacetate, disodium aminotriacetate, cyclohexanediamine tetraacetic acid, disodium cyclic ethylenediamine tetraacetate, citrate, acetate, lactate, aminocarboxylate, mercaptoalkane sulfonate, etc., preferably disodium ethylenediamine tetraacetate, disodium aminoethanoate, disodium cyclic ethylenediamine tetraacetate, or a mixture thereof. The complexing agent may also be an inorganic complex such as pyrophosphate, halogen anion salt, etc.

The solid content of the graphene oxide solution used in step A1 is preferably 0.05%-5%, more preferably 0.1%-1%. If the solid content of the graphene solution is too low, on the one hand, the using amount of complexing agent and the cost will increase, on the other hand, precipitated particles formed during salting-out is small and will pass through the filter cloth easily without forming a filter cake. When the solid content is too high, precipitated particles formed will be too coarse, which will easily cause heavy metal ions with high concentration to be embedded in the depth of the precipitate, and is not conducive to washing. Correspondingly, the concentration of complexing agent solution is preferably 0.15 wt %-5.3 wt %, more preferably 0.37 wt %-3.7 wt %. The concentration of the complexing agent solution in step A2 is preferably 0.15 wt %-5.3 wt %, more preferably 0.37 wt %-3.7 wt %.

The acid used for acid pickling in step A3 is preferably a volatile acid, such as hydrochloric acid, thereby facilitating further removal of the remaining acid after water washing in the drying process. More preferably, a dilute hydrochloric acid with a concentration of 2 wt %-5 wt % can be selected. In the washing process of steps A2 and A3, the filter cake may be pressurized or reduced pressure to perform suction filtration to speed up the washing process.

The pre-purification treatment of graphene oxide is performed according to the above-mentioned method, which can effectively reduce the concentration of each metal ion (such as $Mn^{2+}$) in graphene oxide to less than 200 ppm, even to 200 ppm-10 ppm. Then, the ion exchange purification is performed according to the above-mentioned method, which can not only further reduce the concentration of impurity ions to meet the requirements of energy storage materials and other materials, but also avoid adverse effects of flocculation and ion exchange column poisoning that may occur during the ion exchange process.

After ion exchange purification, the content of the heavy metals in the graphene oxide will drop below 10 ppm, even to 10-0.1 ppm. Besides, deep impurity removal can be carried out in the following manner to obtain graphene oxide products with higher purity. Specifically, the above-mentioned purification method preferably includes the following steps:

Deep purification: the graphene oxide solution obtained after ion exchange purification is purified by electrodeionization.

Currently, electrodeionization (EDI) is used for water treatment. In this application, the electrodeionization is introduced into the purification of the graphene oxide. The principle of purifying graphene oxide in the above-mentioned solution is as follows: the graphene oxide solution includes water, the graphene oxide and heavy metal impurity ions. Under normal conditions, the best way to remove heavy metal ions in the graphene oxide solution is dialysis washing. During dialysis washing, ions are transferred from the graphene oxide solution to an aqueous solution through a membrane by concentration diffusion. However, the dialysis method is time-consuming and requires continuous water change, so it is not suitable for industrial production. In EDI system, an electrodialysis occurs in the graphene oxide solution, namely, a driving force of dialysis washing is no longer concentration difference, but potential difference. The potential difference can be increased by adjusting the parameters of the EDI system, so the removal rate of heavy metal ions in the graphene oxide solution can be greatly increased. On the other hand, the membrane of EDI system itself can be regarded as a selective ion permeable membrane. So, the graphene oxide will be trapped in the fresh water chamber, while heavy metal ions will migrate to a concentrated water chamber at the potential to complete purification.

This step can be specifically as follows: the graphene oxide solution obtained after ion exchange purification is added to the electrodeionization system to collect the solution in the fresh water chamber.

The solid content of the graphene oxide solution is preferably 0.01-10%. When setting the conductivity of concentrated water and the conductivity of product water in EDI equipment, since a graphene oxide sol exists in the product water, a partial dissociation of the graphene oxide sot in aqueous solution will raise the conductivity of water, the resistivity of concentrated water should not be set too high and is preferably 500-1000 us/cm. The resistivity of product water is preferably 0.1-0.5 MΩ/cm. The system current is preferably set to 5-6 A.

The specific operation of this step can be as follows:

The graphene oxide solution is supplied to EDI feed pump for transportation. Control power supply of the EDI system is turned on, then the EDI feed pump is turned on to fill the membrane stack with the solution. The water supply flow can be determined by the designed flow of the EDI feed pump, and a EDI component modules with product water flows of 0.3-0.5 $m^3$/h, 0.7-1.0 $m^3$/h, 1.6-2.0 $m^3$/h and 3.0-3.6 $m^3$/h can be selected. Concentrated water conductivity meter of the EDI equipment is set at 500-1000 us/cm, and water production resistivity is set at 0.1-0.5 MΩ/cm. After pulse water supply and exhaust of the EDI system is completed, the power supply of the module is turned on and the voltage is adjusted to make a running current of the system reach 5-6 A. After 1-2 h, water in the fresh water chamber is collected to obtain the purified graphene oxide solution.

After deep purification of the graphene oxide by the above-mentioned method, the concentration of metal ions in the graphene oxide can be reduced to less than 0.01 ppm. The purified graphene oxide can be used in fields with the most stringent quality requirements for graphene oxide, such as biomedicine, micro devices, etc.

The graphene oxide solution obtained after the ion exchange purification, salting-out washing purification or deep purification can be directly applied according to the application requirements. Alternatively, the graphene oxide can be used after being dried. When drying is needed, the method provided by the present invention can also include the following steps:

drying the graphene oxide solution after the ion purification, the graphene oxide solution after the salting-out washing purification, or the graphene oxide solution after the deep purification to obtain graphene oxide powder.

Specifically, the drying can be spray drying, vacuum drying and freeze drying.

The temperature of spray drying is preferably 100-120° C.

Specifically, the vacuum drying can be as follows: first vacuum concentration is performed, then vacuum drying is performed. The temperature of drying is preferably 30-70° C.

The temperature of freeze drying is preferably −80-50° C.

The embodiments of the present invention also provide a graphene oxide with a content of each metal impurity less than 10 ppm. The graphene oxide can be obtained after the above-mentioned ion exchange purification.

Further, the above-mentioned salting-out washing purification is performed before ion exchange purification. The content of each metal ion after salting-out washing purification can be reduced to less than 200 ppm, and can be further reduced to 200 ppm-10 ppm. After ion exchange purification, the content of each metal impurity can be reduced to 10 ppm-0.1 ppm.

Further, the content of each metal impurity of the graphene oxide obtained after being successively subjected to the ion exchange purification and the deep purification according to the above-mentioned method is less than 0.01 ppm.

The graphene oxide provided by this embodiment has a low content of metal impurity, and can be applied to fields requiring high purity graphene oxide such as biology, medicine and so on, further expanding the application field of graphene oxide.

The present invention will be further illustrated with reference to the following embodiments.

Embodiment 1

Ion Exchange Purification

B1, preparing graphene oxide to be purified into a graphene oxide solution with a solid content of 0.2%;

B2, loading a hydrogen strong acid cation resin and a hydroxide strong base anion exchange resin into an ion exchange column, setting the cation exchange resin in an upper section and the anion exchange resin in a lower section;

B3, sending the graphene oxide solution into the ion exchange column, wherein the flog rate of graphene oxide solution was 200 L/h.

Embodiment 2

Ion Exchange Purification

B1, preparing graphene oxide to be purified into a graphene oxide solution with a solid content of 0.5%;

B2, loading a hydrogen weak acid cation resin and a hydroxide weak base anion exchange resin into an ion exchange column, setting the cation exchange resin in an upper section and the anion exchange resin in a lower section;

B3, sending the graphene oxide solution into the ion exchange column, wherein the flow rate of graphene oxide solution was 50 L/h.

Embodiment 3

Ion Exchange Purification

B1, preparing graphene oxide to be purified into a graphene oxide solution with a solid content of 0.3%;

B2, loading a hydrogen weak acid cation resin and a hydroxide weak base anion exchange resin into an ion exchange column, setting the cation exchange resin in an upper section and the anion exchange resin in a lower section;

B3, sending the graphene oxide solution into the ion exchange column, wherein the flow rate of graphene oxide solution was 120 L/h.

Embodiment 4

Salting-Out Washing Purification

A1, preparing a graphene oxide solution with a solid content of 0.05%, mixing the graphene oxide solution with a disodium ethylenediamine tetraacetate solution having a concentration of 0.15 wt % and filtering to obtain a filter cake containing graphene;

A2, continuously washing the filter cake with the disodium ethylenediamine tetraacetate solution having the concentration of 0.15 wt %;

A3, washing the washed filter cake with 5 wt % hydrochloric acid, and then washing with water to obtain a graphene oxide solution.

Ion Exchange Purification

B1, preparing the graphene oxide solution obtained in step A3 into a graphene oxide solution with a solid content of 0.3%;

Steps B2-B3 are the same as that in Embodiment 3.

Embodiment 5

Salting-Out Washing Purification

A1, preparing a graphene oxide solution with a solid content of 5%, mixing the graphene oxide solution with a sodium citrate solution having a concentration of 5.3 wt % and filtering to obtain a filter cake containing graphene;

A2, continuously washing the filter cake with the sodium citrate solution having the concentration of 5.3 wt %;

A3, washing the washed filter cake with 4 wt % hydrochloric acid, and then washing with water to obtain a graphene oxide solution.

Ion Exchange Purification
Steps B1-B3 are the same as that in Embodiment 4.

Embodiment 6

Salting-Out Washing Purification
A1, preparing a graphene oxide solution with a solid content of 0.1%, mixing the graphene oxide solution with an disodium aminotriacetate solution having a concentration of 0.37 wt % and filtering to obtain a filter cake containing graphene;
A2, continuously washing the filter cake with an disodium aminotriacetate solution having a concentration of 0.4 wt %;
A3, washing the washed filter cake with 4 wt % hydrochloric acid, and then washing with water to obtain a graphene oxide solution.
Ion Exchange Purification
Steps B1-B3 are the same as that in Embodiment 4.

Embodiment 7

Salting-Out Washing Purification
A1, preparing a graphene oxide solution with a solid content of 1%, mixing the graphene oxide solution with a sodium pyrophosphate solution having a concentration of 3.7 wt % and filtering to obtain a filter cake containing graphene;
A2, continuously washing the filter cake with the sodium pyrophosphate solution having the concentration of 3.7 wt %;
A3, washing the washed filter cake with 3.5 wt % hydrochloric acid, and then washing with water to obtain a graphene oxide solution.
Ion Exchange Purification
Steps B1-B3 are the same as that in Embodiment 4.

Embodiment 8

Salting-Out Washing Purification
A1, preparing a graphene oxide solution with a solid content of 0.8%, mixing the graphene oxide solution with a disodium ethylenediamine tetraacetate solution having a concentration of 2.2 wt % and filtering to obtain a filter cake containing graphene;
A2, continuously washing the filter cake with the disodium ethylenediamine tetraacetate solution having the concentration of 2.5 wt %;
A3, washing the washed filter cake with 3.5 wt % hydrochloric acid, and then washing with water to obtain a graphene oxide solution.
Ion Exchange Purification
Steps B1-B3 are the same as that in Embodiment 4.

Embodiment 9

Salting-Out Washing Purification
Steps A1-A3 are the same as that in Embodiment 8.
Ion Exchange Purification
Steps B1-B3 are the same as that in Embodiment 8.
Deep Purification
C1, preparing the graphene oxide solution obtained in step B3 into a graphene oxide solution with a solid content of 0.01%;
C2, adding the graphene oxide solution into an electrodeionization system, and collecting a solution in a fresh water chamber.

The process parameters of the electrodeionization system are set as follows:
product water flow: 0.3 $m^3$/h EDI component module;
conductivity of concentrated water: 500 us/cm;
resistivity of product water: 0.1 Ω/cm;
operating current of system: 5 A.

Embodiment 10

Salting-Out Washing Purification
Steps A1-A3 are the same as that in Embodiment 8.
Ion Exchange Purification
Steps B1-B3 are the same as that in Embodiment 8.
Deep Purification
C1, preparing the graphene oxide solution obtained in step B3 into a graphene oxide solution with a solid content of 10%;
C2, adding the graphene oxide solution into an electrodeionization system, and collecting a solution in a fresh water chamber.

The process parameters of the electrodeionization system are set as follows:
product water flow: 0.7 $m^3$/h EDI component module;
conductivity of concentrated water: 1000 us/cm;
resistivity of product water: 0.5 MΩ/cm;
operating current of system: 6 A.

Embodiment 11

Salting-Out Washing Purification
Steps A1-A3 are the same as that in Embodiment 8.
Ion Exchange Purification
Steps B1-B3 are the same as that in Embodiment 8.
Deep Purification
C1, preparing the graphene oxide solution obtained in step B3 into a graphene oxide solution with a solid content of 0.08%;
C2, adding the graphene oxide solution into an electrodeionization system, and collecting a solution in a fresh water chamber.

The process parameters of the electrodeionization system are set as follows:
product water flow: 1.6 $m^3$/h EDI component module;
conductivity of concentrated water: 800 us/cm;
resistivity of product water: 0.3 MΩ/cm;
operating current of system: 5 A.
Purification Effect Detection:
In the above-mentioned embodiments, all of the graphene oxide to be purified are from the same sample, and the contents of Mn, Fe, Ni, Ti, Na and K in the graphene oxide are listed in the following table:

TABLE 1

| Impurity Content of Graphene oxide to be Purified (Unit: ppm, mg/kg) | | | | | | |
|---|---|---|---|---|---|---|
| | Element | | | | | |
| | Mn | Fe | Ni | Ti | Na | K |
| Content | $10^5$ | $10^5$ | $10^3$ | $10^2$ | $10^3$ | $10^5$ |

The graphene oxide solutions purified in Embodiments 1-3 were dried by spray drying method to obtain graphene oxide solids, which were recorded as samples a, b and c respectively. The contents of Mn, Fe, Ni, Ti, Na and K in the above-mentioned three samples were detected, and the results of the detection are listed in the following table:

TABLE 2

Impurity Content of Graphene oxide after Purification (Unit: ppm, mg/kg)

|   | Mn  | Fe  | Ni  | Ti  | Na  | K   |
|---|-----|-----|-----|-----|-----|-----|
| a | 3.6 | 4.6 | 3.7 | 4.5 | 8.3 | 6.2 |
| b | 2.9 | 4.1 | 2.7 | 3.1 | 6.5 | 4.3 |
| c | 2.1 | 3.7 | 2.2 | 2.8 | 6.0 | 3.7 |

The graphene oxide solids obtained by performing spray drying on the graphene oxide solution after salting-out washing purification in embodiments 4-8 were recorded as samples d', e', f', g', h', respectively. The graphene oxide solids obtained by performing spray drying on the oxidized graphene solution after ion exchange purification were recorded as samples d, e, f, g and h, respectively. The contents of Mn, Fe, Ni, Ti, Na and K in the above-mentioned ten samples were detected, and the results of the detection are listed in the following table:

TABLE 3

Impurity Content of Graphene oxide after Purification (Unit: ppm, mg/kg)

|    | Mn  | Fe  | Ni  | Ti  | Na  | K   |
|----|-----|-----|-----|-----|-----|-----|
| d' | 50  | 106 | 47  | 46  | 107 | 99  |
| e' | 76  | 157 | 82  | 80  | 182 | 164 |
| f' | 23  | 34  | 40  | 39  | 53  | 50  |
| g' | 25  | 39  | 41  | 30  | 49  | 52  |
| h' | 10  | 10  | 11  | 10  | 12  | 10  |
| d  | 1.5 | 3.0 | 1.6 | 2.0 | 5.2 | 2.9 |
| e  | 2.1 | 3.7 | 2.2 | 2.8 | 6.0 | 3.7 |
| f  | 0.7 | 2.5 | 1.2 | 1.4 | 4.3 | 2.0 |
| g  | 0.5 | 2.3 | 1.1 | 1.6 | 4.1 | 2.1 |
| h  | 0.1 | 1.2 | 0.6 | 0.7 | 2.3 | 1.5 |

The graphene oxide solids obtained by performing spray drying on the graphene oxide solution after deep purification in embodiments 9-11 were recorded as samples i, j, k, respectively. The contents of Mn, Fe, Ni, Ti, Na and K in the above-mentioned three samples were detected, and the results of the detection are listed in the following table:

|   | Mn   | Fe    | Ni    | Ti    | Na     | K      |
|---|------|-------|-------|-------|--------|--------|
| i | none | 0.006 | 0.002 | 0.003 | 0.01   | 0.009  |
| j | none | none  | none  | none  | 0.0003 | 0.0001 |
| k | none | none  | none  | none  | none   | none   |

From the above, it can be seen that the content of each metal ion in graphene oxide can be reduced to below 10 ppm by the ion exchange purification method of the present invention. The pre-salting-out purification method can reduce the content of each metal ion in graphene oxide to less than 200 ppm. Then the content of each metal ion can be reduced to 10 ppm-0.1 ppm after ion purification. The post-deep purification can reduce the content of each metal ion to less than 0.01 ppm.

The above-mentioned embodiments are merely preferred embodiments of the present invention, and is not intended to limit the present invention. Any modifications, equivalents and improvements made without departing from the spirit and principle of the present invention shall be considered as falling within the scope of the present invention.

What is claimed is:

1. A purification method of graphene oxide, comprising the following steps:
   ion exchange purification: sequentially passing a graphene oxide solution through a cation exchange resin and an anion exchange resin, wherein the cation exchange resin is a hydrogen cation exchange resin, and the anion exchange resin is a hydroxide anion exchange resin.

2. The purification method of the graphene oxide according to claim 1, wherein a solid content of the graphene oxide solution is 0.2-0.5 wt %.

3. The purification method of the graphene oxide according to claim 1, further comprising the following steps before the ion exchange purification:
   salting-out washing purification: A1, mixing the graphene oxide solution with a first complexing agent solution and filtering to obtain a filter cake containing graphene; A2, continuously washing the filter cake with a second complexing agent solution; A3, performing acid pickling and water washing on the filter cake washed by the second complexing agent solution sequentially.

4. The purification method of the graphene oxide according to claim 3, wherein the complexing agent in step A1 is one or more of selected from the group consisting disodium ethylenediamine tetraacetate, trisodium aminotriacetate, disodium aminotriacetate, cyclohexanediamine tetraacetic acid, disodium cyclic ethylenediamine tetraacetate, citrate, acetate, lactate, aminocarboxylate, mercaptoalkane sulfonate, pyrophosphate, and halogen anion salt; the complexing agent m step A2 is one or more selected from the group consisting of disodium ethylenediamine tetraacetate, disodium ethylenediamine tetraacetate, trisodium aminotriacetate, disodium aminotriacetate, cyclohexanediamine tetraacetic acid, disodium cyclic ethylenediaminetetraacetate, citrate, acetate, lactate, aminocarboxylate, mercaptoalkane sulfonate, pyrophosphate, and halogen anion.

5. The purification method of the graphene oxide according to claim 3, wherein a solid content of the graphene oxide in the step A1 is 0.05%-5%, a concentration of the complexing agent solution is 0.15 wt %-5.3 wt %; a concentration of the complexing agent solution in the step A2 is 0.15 wt %-5.3 wt %.

6. The purification method of the graphene oxide according to claim 1, further comprising the following steps after ion exchange purification:
   deep purification: purifying the graphene oxide solution obtained after ion exchange purification by electrodeionization.

7. The purification method of the graphene oxide according to claim 6, wherein the deep purification specifically comprises the following steps: adding the graphene oxide solution obtained after the ion exchange purification to an electrodeionization system, collecting a solution in a fresh water chamber, wherein in the electrodeionization system, a resistivity of concentrated water is 500-1000 μs/cm, a resistance of product water is 0.1-0.5 MΩ/cm, and a current of the electrodeionization system is 5-6 A.

8. The purification method according to claim 6, wherein a solid content of the graphene oxide solution is 0.01-10%.

9. The purification method according to claim 1, wherein the purification method further comprises the step of drying the graphene oxide solution after the ion exchange purification, the graphene oxide solution after the salting-out washing purification, or the graphene oxide solution after the deep purification to obtain a graphene oxide solid.

10. The purification method according to claim 2, wherein the purification method further comprises the step of drying the graphene oxide solution after the ion exchange purification, the graphene oxide solution after the salting-out washing purification, or the graphene oxide solution after the deep purification to obtain a graphene oxide solid.

11. The purification method according to claim 3, wherein the purification method further comprises the step of drying the graphene oxide solution after the ion exchange purification, the graphene oxide solution after the salting-out washing purification, or the graphene oxide solution after the deep purification to obtain a graphene oxide solid.

12. The purification method according to claim 4, wherein the purification method further comprises the step of drying the graphene oxide solution after the ion exchange purification, the graphene oxide solution after the salting-out washing purification, or the graphene oxide solution after the deep purification to obtain a graphene oxide solid.

13. The purification method according to claim 5, wherein the purification method further comprises the step of drying the graphene oxide solution after the ion exchange purification, the graphene oxide solution after the salting-out washing purification, or the graphene oxide solution after the deep purification to obtain a graphene oxide solid.

14. The purification method according to claim 6, wherein the purification method further comprises the step of drying the graphene oxide solution after the ion exchange purification, the graphene oxide solution after the salting-out washing purification, or the graphene oxide solution after the deep purification to obtain a graphene oxide solid.

15. The purification method according to claim 7, wherein the purification method further comprises the step of drying the graphene oxide solution after the ion exchange purification, the graphene oxide solution after the salting-out washing purification, or the graphene oxide solution after the deep purification to obtain a graphene oxide solid.

16. The purification method according to claim 8, wherein the purification method further comprises the step of drying the graphene oxide solution after the ion exchange purification, the graphene oxide solution after the salting-out washing purification, or the graphene oxide solution after the deep purification to obtain a graphene oxide solid.

* * * * *